United States Patent Office 3,635,916
Patented Jan. 18, 1972

3,635,916
COPOLYMERS OF HALFESTERS OF MALEIC ANHYDRIDE AND 2-ALKOXYPROPENE
Peter Schlumbom, Irvington, and David A. Gordon, Scarsdale, N.Y., assignors to Geigy Chemical Corporation, Greenburgh, N.Y.
No Drawing. Filed Dec. 29, 1969, Ser. No. 888,832
Int. Cl. C08f 27/12
U.S. Cl. 260—78.5 T                                     11 Claims

ABSTRACT OF THE DISCLOSURE

Alkylene oxide monoether halfesters of maleic anhydride/2-alkoxypropene copolymers and alkyl and alkylene oxide mixed halfesters of said copolymers are homogenous film-forming compositions useful in hair spray preparations. There halfesters are prepared by the esterification of the maleic anhydride/2-alkoxypropene copolymer with an appropriate alcohol.

DETAILED DISCLOSURE

This invention relates to novel resinous compositions which are soluble in mild alkali and particularly useful in hair spray formulations. The invention also relates to improved leather treatment systems.

The resins of this invention are halfesters of copolymers of maleic anhydride and α,2-alkoxypropene represented by the repeating units of the formula

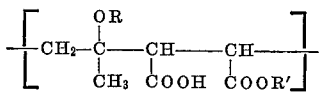

wherein R is an alkyl group having from 1 to 4 carbon atoms and R' is an alkylene oxide monoether group of the general formula:

wherein
$n$ is an integer from 2 to 4 inclusive,
$m$ is an integer from 1 to 20 and R'' is an alkyl group containing from 1 to 18 carbon atoms.

A further embodiment of this invention also includes mixtures of alkylene oxide monoether halfesters described above and alkyl halfesters wherein the alkyl group is from 1 to 8 carbon atoms. The resin compositions comprising the mixed halfesters can contain from 2 to 100 weight percent of the alkylene oxide monoether halfesters and from 0 to 98 weight percent of the alkyl halfesters.

The instant resins are useful as the main components in leather treatment systems and in hair sprays. For the leather treatment compositions halfesters prepared from the low molecular weight copolymers are preferred. In the hair spray compositions the halfesters of this invention are particularly useful as the film forming component. For this purpose the halfesters prepared from both the lower and the higher molecular weight copolymers can be employed. The mixed halfesters are advantageously employed in hair spray formulations when the maleic anhydride/2-alkoxypropene copolymer is of a lower molecular weight. Generally the low molecular weight copolymers have the intrinsic viscosities of up to about 0.12 and the higher molecular weight copolymers have the intrinsic viscosities of about 0.2 and higher. The intrinsic viscosity is measured at 30° C. in tetrahydrofuran.

The maleic anhydride/2-alkoxypropene copolymer which is converted to the halfester can be prepared by a method described in the copending application of Okamura et al., Ser. No. 842,368, filed July 16, 1969. The copolymer prepared by this method generally is of lower molecular weight having an intrinsic viscosity of up to about 0.1. Copolymers having higher intrinsic viscosities can be prepared by the addition of 2-methoxypropene to the reaction mixture as described in Example 2 of this application. Copolymers prepared by this method have intrinsic viscosities of up to about 0.45.

In general, the halfesters of the above polymers are prepared by heating and agitating the maleic anhydride/2-alkoxypropene copolymer with either an ether alcohol or mixture of ether alcohol and an alkyl alcohol. Said alcohol or alcohol mixtures can be employed either in equimolar amounts or in excess with reference to the maleic anhydride. The reaction temperature is in the range of from about 50° to about 150° C. The process can be carried out either in the presence or absence of both an inert solvent and an acid catalyst. Under these conditions only a halfester is formed. Illustrative examples of aliphatic alcohols that can be employed in preparing the mixed halfester copolymers are methanol, ethanol, propanol, isopropanol, butanol, hexanol, octanol and the like. Examples of ether alcohols include 2-methoxyethanol; 2-ethoxyethanol; 2-butoxyethanol; 2-hexoxyethanol; diethylene glycol methyl, ethyl, propyl, butyl and hexyl ether; triethylene glycol methyl ether; triethylene glycol butyl ether; methoxy polyethylene glycols such as Carbowax 350 or 750 (manufactured by Union Carbide), polyethylene (20) stearyl ether; propylene glycol butyl ether; dipropylene glycol methyl ether and the like.

If an alcohol is used in an equimolar amount then it is preferable to carry out the reaction in an inert solvent. Suitable solvents which can be used are solvents having an effective boiling point of at least 50° C. which include ketones like acetone, methyl ethyl ketone, ethers like tetrahydrofuran, dioxane or aromatics such as toluene, ethylbenzene, xylene and the like.

The acid catalysts that can be employed in preparing the halfesters are the mineral acids and the aromatic sulfonic acids. Illustrative examples of the mineral acids are sulfuric acid, hydrochloric acid, sulfonic acid, phosphoric acid, and the like. Illustrative examples of aromatic sulfonic acids are benzene-sulfonic acid, toluenesulfonic acid, xylenesulfonic acid, 5-nitro-1,3-benzenedisulfonic acid, 1,3-benzenedisulfonic acid, 1,3,5-benzenetrisulfonic acid, naphthalenesulfonic acid, anthracenesulfonic acid and the like.

As noted above, the halfester copolymers of this invention can be used as the film forming component in hair spray compositions. The films formed from the hair sprays have generally good adhering properties and good flexibility in addition to good curl retention properties in humid weather. The copolymers can also be employed as leather treating agents.

To illustrate further the nature of this invention there are presented below the following examples. Examples 1 to 4 illustrate the preparation of the maleic anhydride/2-alkoxypropene copolymers and Examples 5 to 9 illustrate the preparation of the halfesters of said copolymers.

EXAMPLE 1

2.5 parts of maleic anhydride and 0.2 parts of α,α'-azo-bis-isobutyronitrile were added to 46.7 parts of acetone dimethyl ketal. The mixture was reacted for 20 hours at 60° to obtain 3.54 parts of copolymer. The product, a copolymer of maleic anhydride and 2-methoxypropene, was a white powdery material which had the intrinsic viscosity of 0.1 in tetrahydrofuran at 30° C.

If, instead of 46.7 parts acetone dimethyl ketal, 50 parts of acetone diethyl ketal, 50 parts of acetone dipropyl ketal or 55 parts of acetone dibutyl ketal are used and otherwise is proceeded in the same way, the 1:1 copolymers of maleic anhydride and the akoxy alkenes derived from the mentioned ketals are obtained.

EXAMPLE 2

In a reaction tube were placed 1.48 parts of maleic anhydride
1.08 parts of 2-methoxypropene
12.5 parts of acetone dimethyl ketal and
0.06 part of α,α'-azo-bis-isobutyronitrile and dissolved to a clear solution. The glass tube was flushed with nitrogen, sealed and heated for 24 hours at 60°. The polymer formed was separated by suction, washed with acetone dimethyl ketal and dried. 2.47 parts of maleic anhydride/2-methoxypropene copolymer was obtained as a white powder. The intrinsic viscosity of the copolymer at 30° C. in tetrahydrofuran was 0.24.

EXAMPLE 3

When in Example 2 the quantities of 2-methoxypropene and acetone dimethyl ketal were 0.54 and 13.3 parts respectively, 2.1 parts of the copolymer were obtained. The intrinsic viscosity was 0.16.

EXAMPLE 4

When in Example 2 acetone dimethyl ketal was replaced by 7.9 parts of 1,4-dioxane, 2.57 parts of the copolymer were obtained. The intrinsic viscosity was 0.3.

EXAMPLE 5

11.9 parts of maleic anhydride/2-methoxypropene copolymer of an intrinsic viscosity of 0.1 and 31.5 parts of 2-ethoxyethanol were stirred in a nitrogen atmosphere for 10 hours at 110° C. The polymeric halfester was separated by pouring the reaction mixture into diethyl ether. After drying, 12.1 parts of 2-ethoxyethyl halfester of maleic anhydride/2-methoxypropene copolymer were obtained as an almost colorless white powder. The material readily dissolves in ethanol.

EXAMPLE 6

When in Example 5 maleic anhydride/2-methoxypropene copolymer is replaced with 14.9 parts of maleic anhydride/2-butoxypropene copolymer, a 2-ethoxyethanol halfester of the starting copolymer in Example 5 is obtained.

EXAMPLE 7

When in Example 5, 2-ethoxyethanol is replaced with 31.5 parts of 3-ethoxypropanol, a 3-ethoxypropanol halfester of maleic anhydride/2-methoxypropene copolymer is obtained.

EXAMPLE 8

Ten parts of maleic anhydride/2-methoxypropene copolymer having an intrinsic viscosity of 0.1, 10.4 parts of Brij 78 (a polyethylene (20) monostearyl ether manufactured by Atlas Chemical Industries, Inc.), 2.3 parts of ethanol, 0.2 part of concentrated HCl and 16 parts of methyl ethyl ketone were stirred at a reflux temperature in a nitrogen atmosphere for 10 hours. The polymeric halfester was separated by pouring the reaction mixture into diethyl ether. After drying, 12.3 parts of the mixed halfesters of maleic anhydride/2-methoxypropene copolymer containing Brij 78 and ethanol groups as the alcohol component were obtained.

EXAMPLE 9

When in Example 8 ethanol was replaced with 3.7 parts of n-butanol, 12.7 parts of the mixed halfesters of maleic anhydride/2-methoxypropene copolymer containing Brij 78 and n-butanol groups as the alcohol were obtained.

EXAMPLE 10

Preparation of hair spray composition 7.9 parts 2-ethoxyethanol halfester of maleic anhydride/2-methoxypropene copolymer having an intrinsic viscosity at 30° C. in tetrahydrofuran of 0.24 and 0.14 part triisopropanolamine were dissolved in 52 parts of anhydrous ethanol. The polymer solution was sprayed with an aerosol dispenser on a swatch of human hair which was then combed and set to a curl. After drying a thin transparent non-gummy film formed on the hair which provided a high curl retention. On washing with warm water and soap or conventional shampoo preparations the film was easily removed.

Similar results are obtained with formulations containing halfester copolymers mentioned below:

(1) Methyl diethylene glycol halfester prepared from maleic anhydride/2-methoxypropene copolymer having an intrinsic viscosity at 30° C. in tetrahydrofuran of 0.1.

(2) Hexyl diethylene glycol halfester obtained from maleic anhydride/2-methoxypropene copolymer with an intrinsic viscosity at 30° C. in tetrahydrofuran of 0.1.

(3) Methyl diethylene glycol halfester of maleic anhydride/2-butoxypropene copolymer.

(4) Mixed halfester obtained from maleic anhydride/2-methoxypropene copolymer having an intrinsic viscosity at 30° C. in tetrahydrofuran of 0.1, n-butanol and methoxy polyethylene glycol of a molecular weight of about 750 as the alcohol component in a molar ratio of 9.5 to 0.5.

(5) Mixed halfester obtained from maleic anhydride/2-methoxypropene copolymer having an intrinsic viscosity of 30° C. in tetrahydrofuran of 0.1, n-butanol and methoxytriethylene glycol in a molar ratio of 1:2.

(6) A halfester copolymer as described in Example 8.

What is claimed is:

1. A halfester of the maleic anhydride/2-alkoxypropene copolymer having the repeating unit of the formula:

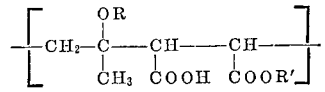

wherein

R is an alkyl group having up to 4 carbon atoms and
R' is an alkylene oxide monoether group or a mixture of alkylene oxide monoether and alkyl group having up to 8 carbon atoms, said alkylene oxide monoether group having the formula:

$$R''(OC_nH_{2n})_m$$

wherein $n$ is an integer from 2 to 4 inclusive,
$m$ is an integer from 1 to 20 and R" is an alkyl group containing from 1 to 18 carbon atoms.

2. A halfester copolymer according to claim 1 wherein R' is alkylene oxide monoether group.

3. A halfester copolymer according to claim 2 wherein R is methyl, $n$ is 2, $m$ is 1 or 2 and R" is alkyl group having 1 to 6 carbon atoms.

4. A halfester copolymer according to claim 2, which is the diethylene glycol hexyl ether halfester of maleic anhydride/2-methoxypropene copolymer.

5. A halfester copolymer according to claim 2 which is diethylene glycol butyl ether halfester of maleic anhydride/2-methoxypropene copolymer.

6. A halfester copolymer according to claim 2 which is 2-ethoxyethanol halfester of maleic anhydride/2-methoxypropene copolymer.

7. A halfester copolymer according to claim 2 which is triethylene glycol methyl ether halfester of maleic anhydride/2-methoxypropene copolymer.

8. A halfester copolymer according to claim 2, which is a mixed n-butanol/diethylene glycol hexyl ether halfester of maleic anhydride/2-methoxypropene copolymer.

9. A halfester copolymer according to claim 2, which is a mixed n-butanol/triethylene glycol methyl ether halfester of maleic anuhydride/2-methoxypropene copolymer.

10. A halfester copolymer according to claim 2, which is a mixed n-butanol/polyethylene glycol methyl ether having a molecular weight of about 750 halfester of maleic anhydride/2-methoxypropene copolymer.

11. A halfester copolymer according to claim 2, which is a mixed ethanol/polyethylene glycol monostearyl ether having a molecular weight of about 1150 halfester of maleic anhydride/2-methoxypropene copolymer.

References Cited

UNITED STATES PATENTS

| | | | |
|---|---|---|---|
| 3,392,155 | 7/1968 | Muskat | 260—78.5 |
| 3,436,378 | 4/1969 | Azorlosa et al. | 260—78.5 |
| 3,468,857 | 9/1969 | Graver | 260—80.3 |

FOREIGN PATENTS 453,476  12/1948  Canada _____ 260—78.5

JOSEPH L. SCHOFER, Primary Examiner
JOHN KIGHT, Assistant Examiner

U.S. Cl. X.R.

424 DIG 1; 8—94.1 R